No. 12,053. Reissued Nov. 4, 1902.
H. L. WILSON.
STEAM BOILER.
(Application filed Mar. 10, 1902.)
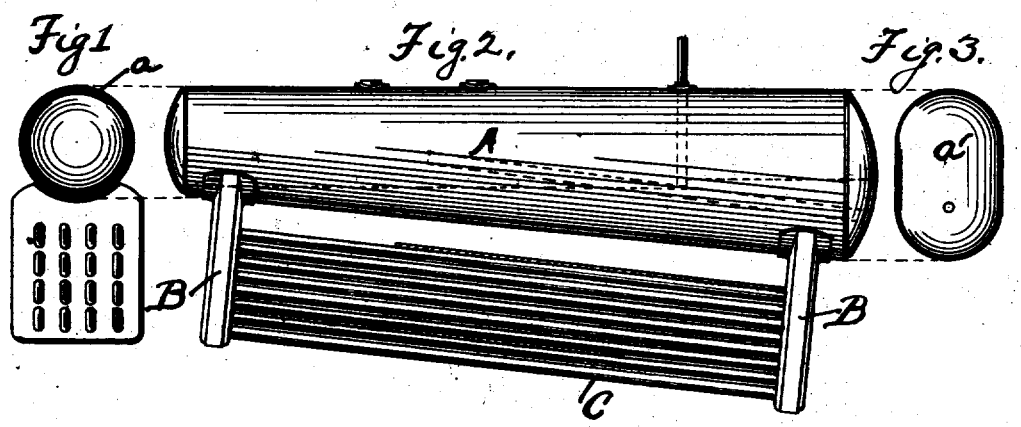
Witnesses
M. A. Lond
A. E. Yard
Inventor
Harry L. Wilson
by H. C. Pinel
his Atty

UNITED STATES PATENT OFFICE.

HARRY L. WILSON, OF ERIE, PENNSYLVANIA, ASSIGNOR TO THE ERIE CITY IRON WORKS, OF ERIE, PENNSYLVANIA.

STEAM-BOILER.

SPECIFICATION forming part of Reissued Letters Patent No. 12,053, dated November 4, 1902.

Original No. 685,418, dated October 29, 1901. Application for reissue filed March 10, 1902. Serial No. 97,678.

DIVISION B.

*To all whom it may concern:*

Be it known that I, HARRY L. WILSON, a citizen of the United States, residing at Erie, county of Erie, State of Pennsylvania, have invented certain new and useful Improvements in Steam-Boilers, of which the following is a specification, reference being had to the accompanying drawings.

This invention relates to one of the modifications shown in Patent No. 685,418, granted October 29, 1901, of which this is a reissue; and the improvements contemplated in the invention are specially designed with reference to water-tube boilers in which a continuous circulation is afforded between a series of water-tubes and a superimposed drum, which tubes and drum are connected at their opposite ends by means of head-sections or water-legs.

The chief aim of the present invention is to promote the circulation of the water in and through the different portions of the boiler, thereby effecting a more rapid and thorough generation of steam and increasing the efficiency of the boiler.

Another object of the invention is to simplify the form of joint between the drum and head-sections. This is obtained by inclining the bottom of the drum so that the head-sections are at right angles to the inclined water-tubes and so inclined may form a connection with the drum at a better angle than would be the case if that part of the drum at which the connection were made were not inclined, preferably, at a right angle. Incident to this construction there is also a possibility of making the head-sections of equal length, and thus cheapening the construction and aiding the circulation by reason of the shortening of one of the sections.

With the above and other objects in view, the nature of which will appear as the description proceeds, the invention consists in the novel construction, combination, and arrangement of parts hereinafter fully described, illustrated, and claimed.

In the accompanying drawings, Figure 1 shows an end elevation of the boiler; Fig. 2, a side elevation; Fig. 3, an end view of the drum.

A marks the drum. It is of uniform width, preferably round at the front end $a$ and ellipsoidal at the opposite end $a'$, the top being horizontal and the bottom inclined. The head-sections B are connected to the bottom of the drum and are preferably arranged at right angles to the bottom of the drum, thus being inclined at the top toward a right angle to the bottom of the drum. The water-tubes C connect the head-sections and are at right angles to the head-sections and parallel to the bottom of the drum.

By making the upper part of the drum horizontal an enlarged steam-space is assured, and by dropping or inclining the bottom of the drum the head-sections may be arranged practically at right angles to the bottom of the drum, so as to make a better joint, and they may be made of similar size and shape. The water-tubes, which are preferably at right angles to the head-sections, will then be parallel to the bottom of the drum, as is preferable. The drum being of uniform width the inclosing walls are parallel and are readily constructed.

What I claim as new is—

1. In a steam-boiler, the combination of a drum having portions of the bottom of its shell inclined to the top of the drum; head-sections secured to said inclined portions of the drum at right angles to the shell at the point of connection; and water-tubes connecting said head-sections and arranged at right angles to said head-sections and parallel to the portions of the drum to which the head-sections are connected.

2. In a steam-boiler, the combination of a drum of uniform width having a portion of its bottom inclined to its top; and head-sections secured to said inclined bottom at right angles thereto.

3. In a steam-boiler, the combination of a drum having a horizontally-arranged top, and an inclined bottom, said drum being of uniform width and circular at one end and ellipsoidal at the other, and of gradually-increasing size from end to end; head-sections connected with the bottom of said drum, said sections being inclined to the top of the drum in a direction toward a right angle to the bottom of the drum; and water-tubes connecting said head-sections.

4. In a steam-boiler, a drum having the lower portion thereof arranged at an inclination to the upper portion, one end of the drum being circular and the opposite end ellipsoidal; head-sections connected with the bottom of the drum and inclined to the top of the drum; and water-tubes connected with said head-sections.

In testimony whereof I affix my signature in the presence of two witnesses.

HARRY L. WILSON.

Witnesses:

C. SWALLEY,

H. C. LORD.